(12) United States Patent
Neumann et al.

(10) Patent No.: US 10,417,107 B2
(45) Date of Patent: Sep. 17, 2019

(54) DATA LOGGER AND METHOD FOR TRANSMISSION OF DATA FROM THE DATA LOGGER TO AN EXTERNAL DATA PROCESSING DEVICE

(71) Applicant: ELPRO-BUCHS AG, Buchs (CH)

(72) Inventors: Dirk Neumann, Bad Ragaz (CH); Beat Rudolf, Igis (CH)

(73) Assignee: ELPRO-BUCHS AG, Buchs (CH)

( * ) Notice: Subject to any disclaimer, the term of this patent is extended or adjusted under 35 U.S.C. 154(b) by 122 days.

(21) Appl. No.: 15/792,142

(22) Filed: Oct. 24, 2017

(65) Prior Publication Data

US 2018/0113777 A1 Apr. 26, 2018

(30) Foreign Application Priority Data

Oct. 25, 2016 (CH) .................................... 1431/16

(51) Int. Cl.
| | |
|---|---|
| G06F 11/30 | (2006.01) |
| G03B 15/03 | (2006.01) |
| H04N 5/225 | (2006.01) |
| H04W 4/18 | (2009.01) |
| H04W 88/02 | (2009.01) |
| G01D 9/00 | (2006.01) |

(52) U.S. Cl.
CPC ......... *G06F 11/3068* (2013.01); *G01D 9/005* (2013.01); *G03B 15/03* (2013.01); *G06F 11/3013* (2013.01); *H04N 5/2256* (2013.01); *H04W 4/18* (2013.01); *H04W 88/02* (2013.01)

(58) Field of Classification Search
CPC . G06F 11/3068; G06F 11/3013; G01D 9/005; H04W 88/02; H04W 4/18; G03B 15/03; H04N 5/2256
See application file for complete search history.

(56) References Cited

U.S. PATENT DOCUMENTS

| | | | |
|---|---|---|---|
| 7,826,890 B1 * | 11/2010 | Winchester, Jr. .... | A61B 5/0059 600/407 |
| 10,269,272 B1 * | 4/2019 | Wainwright ............ | G09F 9/305 |
| 2002/0039068 A1 * | 4/2002 | Holowick .............. | G01D 4/006 340/870.02 |
| 2017/0264833 A1 * | 9/2017 | Barnes ................... | H04N 5/332 |

\* cited by examiner

*Primary Examiner* — Michael Won
(74) *Attorney, Agent, or Firm* — Buchanan Ingersoll & Rooney PC

(57) ABSTRACT

A data logger includes functional units for acquisition, digitization, storage and evaluation of measurement data and for wireless transmission of data to an external data processing device. The external data processing device provides photographic acquisition for recording of static and/or dynamic patterns of electromagnetic radiation. An optical indicator device emits and/or reflects electromagnetic radiation. The functional unit for data transmission is coupled to the optical indicator device such that data will can be transmitted in coded form via time-controlled and/or intensity-controlled activation.

21 Claims, 2 Drawing Sheets

DATA LOGGER AND METHOD FOR TRANSMISSION OF DATA FROM THE DATA LOGGER TO AN EXTERNAL DATA PROCESSING DEVICE

RELATED APPLICATION

This application claims priority under 35 U.S.C. § 119 to Swiss Patent Application No. 01431/16 filed in Switzerland on Oct. 25, 2016, the entire content of which is hereby incorporated by reference in its entirety.

FIELD

The present disclosure relates to a data logger and a method for transmission of data from the data logger to an external data processing device.

BACKGROUND INFORMATION

Data loggers are electronic devices which automatically monitor and record various ambient parameters, for example temperature and/or humidity, over time. A data logger contains a detector which picks up the information, and one or more electronic circuits for storage, digitization and optionally evaluation of measurement data and for transmission of data to an external data processing device.

Data loggers can perform long-term pick-up of measurement parameters without monitoring personnel being continually present on site. Data loggers are used in field tests, in the monitoring of transports, for example in the monitoring of acceleration values, vibration values and climatic values in truck or rail carriers, for recording of humidity and temperature values in transport and in warehouses, in the pharmaceutical and food industry, for fault analysis of systems, for example for acquisition of voltage fluctuations in or on a system, for monitoring and alerting in production processes and in quality studies, in research, development and training. Data loggers are also used for recording and monitoring of measurement data in the hobby domain, for example in model aircraft.

Measurement data which has been stored and acquired over a longer time interval can be processed, graphically displayed and statistically evaluated for documentation. In addition to measurement data, data loggers often also acquire various predefined events, such as for example a battery change, an operator intervention, or the change of a memory card, which take place on the device during a monitoring interval. Thus such data loggers can satisfy an important criterion of the pharmaceutical, food and chemical industry which is known as the audit trail. The measurement data which have been acquired by the data logger and the data for the audit trail are filed in an internal hardware memory. To evaluate all data, the data logger can be connected by cable to the data processing system, for example a PC, in order to read out the data. The data can also be read out via a cable-based or also a cableless LAN or similar connection. Data loggers are also known which enable data transfer via WiFi technology, Bluetooth or NFC technology to smartphones or tablet computers. After reading out the data, they can be processed with a hardware-specific evaluation software in order to display them in the form of tables or graphics and to prepare documents or reports. These known data loggers have a relatively complex structure and include corresponding cable-linked or wireless interfaces for reading out or for transmitting measurement data.

Known data loggers can be equipped with a screen display which can enable direct display and indication of measurement data and hardware-internal evaluations. Other known data loggers have one or more LEDs with which the system state can be indicated. The LEDs can also be used in some of the known data loggers for indication of the boundary values of one or more monitored parameters being exceeded. Using these data loggers for example the expiration date of a product can also be monitored and displayed by an LED when it has passed.

SUMMARY

A data logger is disclosed comprising: functional units configured for each of acquisition, digitization, storage and optional evaluation of measurement data and for wireless transmission of data to an external data processing device having a photographic acquisition capability for recording of static and/or dynamic patterns of electromagnetic radiation; and an optical indicator device which is configured to emit and/or reflect electromagnetic radiation, wherein the functional unit for data transmission is coupled to the optical indicator device such that data will be transmitted in coded form by time-controlled activation of the optical indicator device via emission and/or reflection of electromagnetic radiation.

A method is also disclosed for transmission of data from a data logger to an external data processing device, the method comprising: transmitting digital data stored in a storage unit of the data logger according to a data protocol wirelessly to the external data processing device; activating a functional unit for data transmission activates in a time-controlled manner, via an optical indicator device which emits and/or reflects electromagnetic radiation and which is located visibly on the data logger such that data in coded form are converted as static and/or dynamic patterns of electromagnetic radiation by the optical indicator device; and acquiring data at a photographic acquisition apparatus located on the data processing device, and recording the data for further processing in the data processing device.

BRIEF DESCRIPTION OF THE DRAWINGS

Other advantages and features will become apparent from the following description of exemplary embodiments, with reference to the schematics. In the figures, which are not to scale.

DETAILED DESCRIPTION

Figure 1:
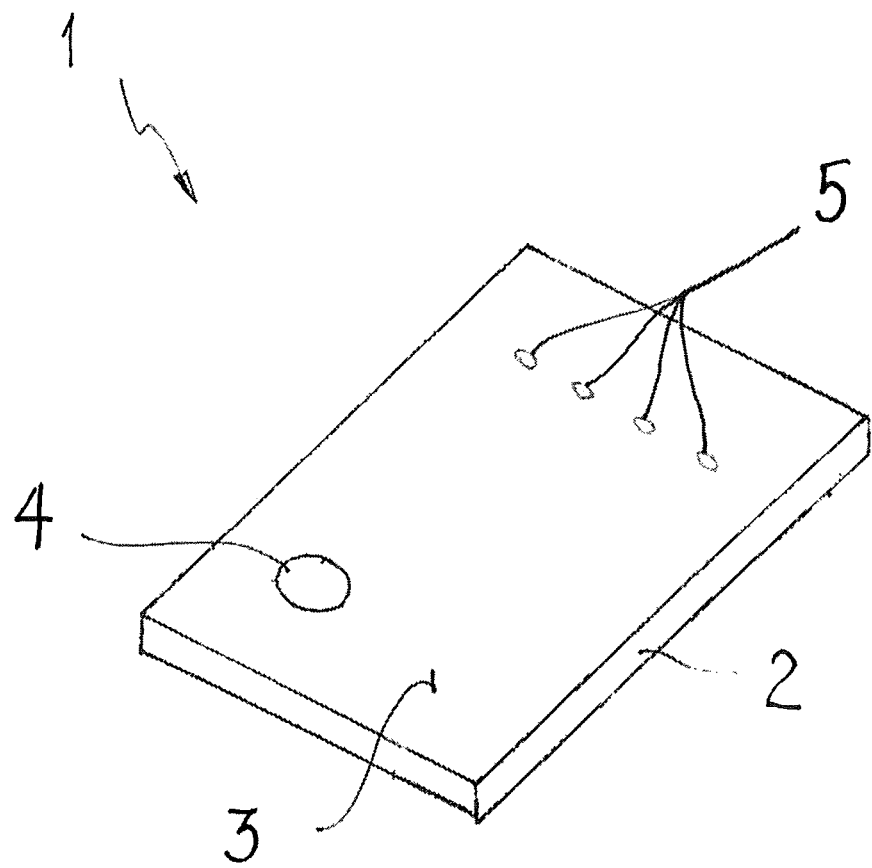
FIG. 1 shows a schematic of an exemplary embodiment of a data logger.

An economical data logger is disclosed in which complex data interfaces for wired and complex transmitting and receiving apparatus can be omitted for wireless data transmission. The data logger can have a simple structure; it will be possible to omit space-intensive and energy-intensive screen displays. Here reading out the data with commercial smartphones or tablet computers will be enabled.

An exemplary data logger has functional units for acquisition, digitization, storage and optionally evaluation of measurement data and for wireless transmission of data to an external data processing device. The external data processing device can be equipped with a photographic acquisition apparatus for recording of static and/or dynamic patterns of electromagnetic radiation. The data logger can have an optical indicator device which emits and/or reflects electromagnetic radiation. The functional unit for data transmission is coupled to the optical indicator device which emits and/or reflects electromagnetic radiation such that the data can be transmitted in coded form by activation of the optical indicator device which emits and/or reflects electromagnetic radiation, which activation is time-controlled and/or controlled according to intensity.

The data logger can have a very simple and economical structure. The data can be transmitted directly in coded form via a optical indicator device which emits and/or reflects electromagnetic radiation and which is provided on the device. The optical indicator device can be made active or passive. Active means that the optical indicator device itself is made for emission of electromagnetic radiation. A passive optical indicator device does not itself emit electromagnetic radiation, but is dependent on an external radiation source. For radiant exposure, such as illumination, the passive optical indicator device reflects a part of the incident electromagnetic radiation. The term "reflect" as used herein is intended to include both, a glossy reflection and a diffuse reflection.

In the data logger, standardized data interfaces, such as for example a USB interface on the housing of the data logger, Bluetooth, ZigBee, WLAN or NFC, can be omitted. The data can be measured raw data and/or also events of the already evaluated measurement data. Complete data sets or only extracts from the data can also be transmitted. The data transmitted in coded form can be acquired and recorded directly by an external data processing device by its photographic acquisition apparatus recording the static and/or dynamic light patterns which have been produced by the optical indicator device which emits and/or reflects electromagnetic radiation and storing them in a storage unit of the data processing device for further processing. Optionally the data loggers can also have a button or a control knob to choose different modes of the data logger, for example on/off, measurement mode, transmission mode.

The optical indicator device which emits and/or reflects electromagnetic radiation can be for example a screen apparatus which can be used not only for display of text and/or values, but on which static and/or dynamic light patterns which have been encoded for data transmission and which can be acquired by the photographic acquisition apparatus of the data processing device are displayed.

In one version of the data logger the optical indicator device which emits and/or reflects electromagnetic radiation can comprise one or more electronic components which emit and/or reflect the electromagnetic radiation when triggered accordingly. The electromagnetic radiation can be in the visible wavelength spectrum from roughly 380 to roughly 780 nm, or it can be infrared radiation from roughly 780 nm to 1 mm. Combined emissions and reflections of visible radiation and infrared radiation are also possible. There can also be combinations of emissions and reflections of electromagnetic radiation.

The components which emit and/or reflect electromagnetic radiation in another version can include one or more semiconductor components. For example the semiconductor components can be one or more light emitting diodes. Light emitting diodes for emissions in the visible and in the infrared wavelength spectrum have been known for a long time. They are economical to produce and for their operation require only relatively small amounts of energy. In many of the known data loggers there are already one or more light emitting diodes on the device anyway, for example to display an operating state of the data logger with them. The light emitting diodes on the data logger can then no longer display only one operating state, but can be directly used for encoded data transmission to an external data acquisition device. An alternative version can provide for the components which emit and/or reflect electromagnetic radiation to encompass liquid crystal elements or electromagnetic paper. A optical indicator device which has liquid crystal elements requires external illumination with a primary light source. The scattered or reflected electromagnetic radiation can then be recorded by an external data acquisition device. Electronic paper is likewise a passive display and therefore involves illumination with a primary light source. It is used for example for displays of so-called E-book readers or as price labels in the retail trade. Compared to these static displays, the use of electronic paper in a data logger differs by the controlled display dynamics.

Another version of the data logger can provide for there to be, besides at least one semiconductor component or electronic component for display of the operating state, at least one further semiconductor component or electronic component which is used only for data transmission. The at least one additional semiconductor component or electronic component can be optimized with respect to its data transmission function. In this way the data transmission rates are increased and optimized.

The functional unit for data transmission can be made for modulation of the optical indicator device which emits and/or reflects electromagnetic radiation, which modulation is time-controlled and/or intensity-controlled. It can be digital phase modulation which can be carried out for example according to a one-dimensional and/or multidimensional Manchester code. The Manchester code is used to transmit data and the clock-pulse rate at the same time. The transmission of the clock-pulse rate is desired since the photographic acquisition apparatus on the portable data processing device can be operated asynchronously to the clock of optical indicator device which emits and/or reflects electromagnetic radiation apparatus, for example the static and/or dynamic light patterns which have been delivered by the light emitting diodes.

Within the scope of the present disclosure, the Manchester code can also include the protocol of a differential Manchester code. A multidimensional Manchester code is used when the data transmission takes place for example via several light emitting diodes which can be operated in parallel or similar active and passive optical indicator device, for all light emitting diodes only ever at least one light emitting diode changing its state from one brightness value to the next. Modulation can take place digitally via activation or de-activation of the respective light emitting diode. In another embodiment the light emitting diodes can also be operated with staggered brightness.

Data transmission by electromagnetic radiation takes place to an external data processing device. It can be a stationary device or a portable device. In one version of the data logger the optical indicator device which emits and/or reflects electromagnetic radiation, such as light and/or infrared radiation, and which is triggered by the functional unit for data transmission can be made for visual unidirectional communication with a smartphone, a notebook or a tablet computer. The smartphone, the notebook or the tablet computer have a camera for visual pick-up of static and/or dynamic light patterns. For acquisition and for processing of the transmitted data they can be provided with an application for decoding and further processing of the data which have been transmitted by the optical indicator device which emits and/or reflects electromagnetic radiation. In doing so, the functional unit for data transmission can be made for transmission of data to a smartphone, to a notebook or to a tablet computer with any operating system. In particular the smartphone or the tablet computer can be chosen from the group consisting of Android, iOS, Windows Phone and Blackberry OS.

Smartphones, notebooks and tablet computers have become common in the meantime. They are and are being equipped with higher and higher quality cameras so that the data which have been transmitted via the optical indicator device which emits and/or reflects electromagnetic radiation, such as visible light or infrared radiation, for example light emitting diodes, liquid crystal elements or electronic paper, can be very quickly and reliably acquired. The acquisition and recording of the transmitted data take place regardless of the type of smartphone, notebook or tablet computer and its operating system.

The electromagnetic radiation emitting and/or reflecting optical indicator device which is triggered by the functional unit for data transmission can also be made for unidirectional communication with an embedded computer system. An embedded computer system is defined as a data processing device which in contrast to personal computers is not equipped with the peripherals such as keyboard, mouse or hard disk, but uses a special peripheral such as for example function keys, rotary switches, etc. An embedded computer system is made only for quite specific tasks and therefore can involve only a minimum cost for hardware and software. The processor is made only to perform the specific task and can be for example a field programmable gate array (FPGA) or a special application specific integrated circuit (ASIC). In this way the power consumption of the embedded computer system can be kept very low. An embedded computer system often does not even require its own operating system or it makes do with special reduced versions of standard operating systems. Application programs which are executed as so-called embedded software are optimized with respect to their function and can be characterized by a very stable execution.

In one especially simple exemplary embodiment, the invention the functional units and the optical indicator device are located on a circuit board. The circuit board with the functional units and the optical indicator device then forms the data logger. To protect against moisture, the assembled circuit board can be provided with a moisture-repellent covering, for example a suitable coating. In another exemplary embodiment, the functional units which can be mounted on a circuit board are located within a housing. The optical indicator device is then mounted visibly from the outside on the housing or within the housing.

A method for transmission of data from a data logger to an external portable data processing device in which digital data stored in a storage unit of the data logger are transmitted according to a data protocol wirelessly to the external portable data processing device includes, for example, a functional unit for data transmission which activates an optical indicator device which emits and/or reflects electromagnetic radiation in a time-controlled manner such that the data in coded form are converted as static and/or dynamic patterns of electromagnetic radiation. The static and/or dynamic patterns of electromagnetic radiation can be acquired by a photographic acquisition apparatus which is located on a portable data processing device and can be recorded for further processing in the portable data processing device. The transmitted data can be complete data sets or also only extracts of data.

The electromagnetic radiation can be in the visible wavelength spectrum from roughly 380 to roughly 780 nm, or it can be infrared radiation from roughly 780 nm to 1 mm. Combined emissions and reflections of visible radiation and infrared radiation are also possible. Within the scope of this disclosure, light can be understood to include visible light and infrared radiation.

The data can be transmitted for example by modulation of one or more electronic components which emit and/or reflect electromagnetic radiation and which are located on the device, for example light emitting diodes and/or liquid crystal elements and/or electronic paper to a smartphone, a notebook or to a tablet computer which are each equipped with a camera. In doing so, the electronic components can be modulated over time and/or intensity- or brightness-controlled. For example, the data can be transmitted by digital phase modulation in which one-dimensional or multidimensional Manchester code is used.

The external data processing device can be a stationary device or a portable device, for example a smartphone, a notebook or a tablet computer which has a camera and which is equipped with an application which can be executed under an operating system from the group consisting of Android, iOS, Windows Phone and Blackberry OS and by which the data which have been transmitted from the light-emitting optical indicator device are decoded and further processed. Alternatively the external data processing device can also be a so-called embedded computer system which was already discussed.

Referring to FIG. 1, the data logger is labeled with reference number 1 throughout. The data logger 1 has a housing 2 which has on its top 3 a button 4 via which the different modes of the data logger, for example on/off, measurement mode, transmission mode can be selected. The data logger 1 has a number, in the described exemplary embodiment four, light emitting diodes 5 which are embedded into the top 3 of the housing 2. The data logger 1 can also be equipped with one or more inputs for one or more detectors, for example a temperature sensor, a humidity sensor, etc. Alternatively the detector or detectors can also already be integrated within the housing 2. Within the housing 2 there are various functional units for acquisition, digitization, storage and optionally evaluation of measurement data and for transmission of data. The functional units can be coupled to a central microprocessor which can be activated in turn by the button 4 on the top 3 of the housing and via which the different modes of the data logger 1 can be selected. Alternatively the functional units can have their own microcontrollers. The respective functional unit is likewise activated via the button 4 on the top 3 of the housing 2 of the data logger 1.

Furthermore, within the housing 2 there is a power supply unit which supplies the functional units with the required power. For example the power is made available by a battery or the like. A solar panel can also be embedded into the top of the housing 2 via which a battery which is located within the housing 2 can be recharged.

The light emitting diodes 5 which are embedded into the top 3 of the housing 2 of the data logger 1 can for example display a just selected operating mode of the data logger. But their primary function consists in the visual transmission of the data which have been stored in the data logger 1 to an external portable data processing device.

Figure 2:
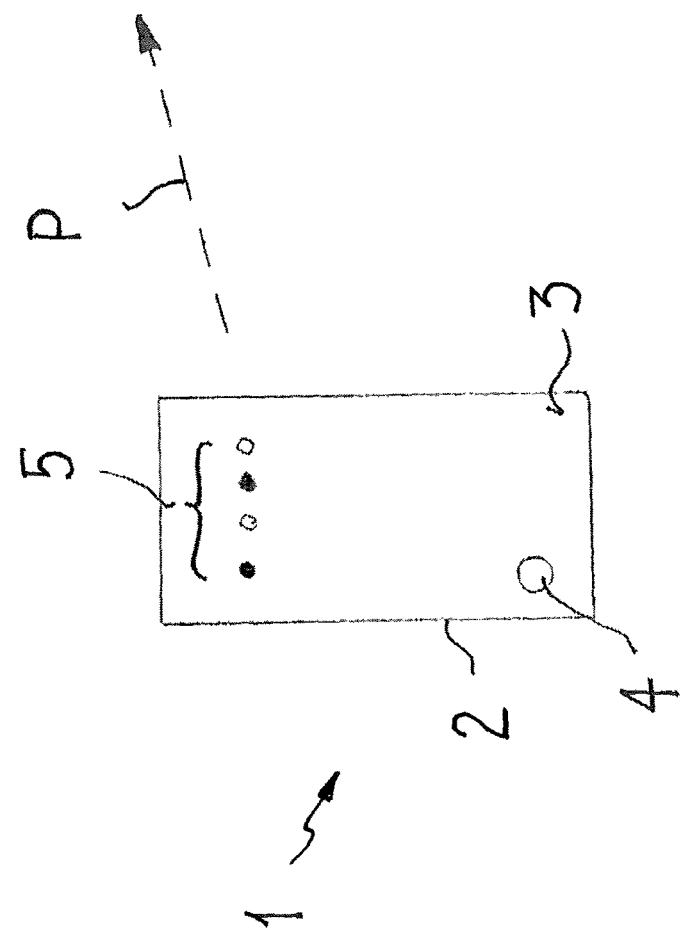
FIG. 2 shows an exemplary schematic of a transmission of data from a data logger to a portable data processing device which is equipped with a camera.

FIG. 2 shows a combination of a data logger which is labelled with reference number 1, with an external data processing device which is labelled with reference number 11 throughout. The external data processing device 11 is for example a smartphone which is equipped with a camera for taking static and moving pictures and which is labelled with reference number 12. It goes without saying that the portable data processing device can also be a tablet computer or even a notebook computer, which are each equipped with a camera for taking static and moving pictures.

For data transmission from the data logger 1 to the smartphone 11, the corresponding functional unit of the data logger 1 is activated via the button 4. The unit is coupled to the light emitting diodes 5 on the top 3 of the housing 2 of the data logger 1 and transmits the data by activation of the light emitting diodes 5 in coded form, which activation is time-controlled and/or intensity-controlled. FIG. 2 shows the first and third light emitting diode from the left in solid black. This is intended to symbolize the controlled activation of the light emitting diodes 5. The transmission of data to the smartphone 11 is indicated by a broken-line arrow P.

The smartphone 11 is equipped with an application which can be executed under one or more operating systems such as for example Android, iOS, Windows Phone and Blackberry OS. The coded light pulses of the light emitting diodes 5 of the data logger 1 which have been recorded by the camera 12 are decoded by the application again to the transmitted data, stored and can be further processed. The results of the further processing can then be output for example via a screen 13 of the smartphone 11 in the form of a report. Alternatively the results can also be relayed electronically, for example by e-mail, in report form, for example as a PDF file.

The functional unit for data transmission which is located within the housing 2 of the data logger 1 can be made for time- and/or brightness-controlled modulation of the light emitting diodes 5. It can be digital phase modulation which can be carried out for example according to a one-dimensional and/or multidimensional Manchester code. The Manchester code is used here to transmit data and the clock-pulse rate at the same time. The generated signal always guarantees clock-pulse edges in order to recover both the data and the clock-pulse rate. The transmission of clock-pulse rate is desired since the photographic acquisition apparatus on the portable data processing device can be operated asynchronously to the clock of the light pulses which have been delivered by the light emitting diodes. Within the scope of the disclosure, the Manchester code also includes the protocol of a differential Manchester code. A multidimensional Manchester code is used when the data transmission takes place via several light emitting diodes which can be operated in parallel or similar optical indicator device, for all light emitting diodes only ever at least one light emitting diode changing its state from one brightness value to the next. Modulation can take place digitally via activation or de-activation of the respective light emitting diode. In another version of the invention the light emitting diodes 5 can also be operated with staggered brightness. This can increase the transmission rate.

Exemplary embodiments have been explained on the example of a data logger with a housing and with four light emitting diodes located on the housing and of a smartphone which is equipped with a camera. It goes without saying that the data logger need not necessarily have a housing. The data logger can also be formed by a circuit board or a card on which the various functional units and the optical indicator device are located. The data logger can also have fewer or even a larger number of light emitting diodes than explained using the described exemplary embodiment. Data transmission can also be carried out with only one light emitting diode. The attainable transmission rate is however still relatively low. Instead of the light emitting diodes, the data logger can also have an active or passive screen display, for example a liquid crystal display or an electronic paper display. The data transmission can then take place for example by producing light pulses on the screen.

In the case of a passive optical indicator device illumination by a primary light source is desired to make the display detectable for the camera. The light pulses in the visible and/or in the infrared range of the wavelength spectrum are acquired by the camera of the portable data processing device which can be besides a smartphone also a tablet computer or a notebook computer, are recorded and decoded and further processed with the corresponding application. The description herein is therefore used only to explain the exemplary embodiment and should not be regarded as limiting. Rather the invention is defined by the claims and the equivalents accessible to one skilled in the art and encompassed by the general idea of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A data logger comprising:
    functional units configured for each of acquisition, digitization, storage and optional evaluation of measurement data and for wireless transmission of data to an external data processing device having a photographic acquisition capability for recording of static and/or dynamic patterns of electromagnetic radiation; and
    an optical indicator device which is configured to emit and/or reflect electromagnetic radiation, wherein the functional unit for data transmission is coupled to the optical indicator device such that data will be transmitted in coded form by time-controlled activation of the optical indicator device via emission and/or reflection of electromagnetic radiation.

2. The data logger as claimed in claim 1, wherein the optical indicator device configured to emit and/or reflect electromagnetic radiation comprises:
    one or more electronic components configured to emit and/or reflect the electromagnetic radiation.

3. The data logger as claimed in claim 2, wherein electromagnetic radiation to be emitted and/or reflected by the electronic components is light in a visible wavelength spectrum and/or infrared radiation.

4. The data logger as claimed in claim 3, wherein the electronic components configured to emit and/or reflect electromagnetic radiation comprise:
    semiconductor components.

5. The data logger as claimed in claim 4, wherein the semiconductor components comprise:
    one or more light emitting diodes and/or liquid crystal elements and/or electronic paper.

6. The data logger as claimed in claim 5, wherein at least one of the semiconductor components is configured for status display and at least one of the semiconductor components is configured for data transmission.

7. The data logger as claimed in claim 6, wherein the functional unit for data transmission is configured for time-controlled and/or intensity-controlled modulation of the optical indicator device which is configured to emit and/or reflect electromagnetic radiation.

8. The data logger as claimed in claim 7, wherein the functional unit for data transmission is configured for triggering of the optical indicator device by digital phase modulation.

9. The data logger as claimed in claim 8, wherein the digital phase modulation is based on a one-dimensional or multidimensional Manchester code.

10. The data logger as claimed in claim 9, wherein the functional unit for data transmission is configured for transmission of data to a smartphone or to a tablet computer with an operating system or to an embedded computer system.

11. The data logger as claimed in claim 10, wherein the optical indicator device configured for unidirectional communication with a smartphone, a tablet or notebook computer which has a camera for recording of static and/or dynamic light patterns and an application for decoding and further processing of data transmitted by the optical indicator device.

12. The data logger as claimed in claim 11, in combination with an external data processing device having a photographic acquisition capability for recording the electromagnetic radiation, wherein the function unit for data transmission is configured for transmitting data to a smartphone or to a tablet computer with an operating system from a group consisting of Android, iOS, Windows Phone and Blackberry OS.

13. The data logger as claimed in claim 11, wherein the functional units and the optical indicator device are located on a circuit board with a moisture-repellent covering.

14. The data logger as claimed in claim 11, wherein the functional units are located within a housing and the optical indicator device is mounted visibly from outside the housing or within the housing.

15. A method for transmission of data from a data logger to an external data processing device, the method comprising:

transmitting digital data stored in a storage unit of the data logger according to a data protocol wirelessly to the external data processing device;

activating a functional unit for data transmission activates in a time-controlled manner, via an optical indicator device which emits and/or reflects electromagnetic radiation and which is located visibly on the data logger such that data in coded form are converted as static and/or dynamic patterns of electromagnetic radiation by the optical indicator device; and acquiring data at a photographic acquisition apparatus located on the external data processing device, and recording the data for further processing in the external data processing device.

16. The method as claimed in claim 15, comprising:

transmitting the data as static and/or dynamic light patterns in a visible wavelength range and/or as infrared radiation.

17. The method as claimed in claim 16, comprising:

transmitting the data by modulation of one or more electronic components which emit or reflect electromagnetic radiation and which are located on the data logger, wherein the components can be configured to include light emitting diodes and/or liquid crystal elements and/or electronic paper, to a smartphone, to a notebook or to a tablet computer which is equipped with a camera.

18. The method as claimed in claim 17, comprising:

modulating the electronic components which emit or reflect electromagnetic radiation in a time- and/or intensity controlled manner.

19. The method as claimed in claim 18, comprising:

transmitting the data using digital phase modulation.

20. The method as claimed in claim 19, comprising:

performing the digital phase modulation with a one-dimensional or multidimensional Manchester code.

21. The method as claimed in claim 20, wherein the external data processing device is equipped with an application for execution, under at least one operating system from a group consisting of Android, iOS, Windows Phone and Blackberry OS or by an embedded version of a standard operating system, such that data transmitted from the optical indicator device is decoded and processed.

* * * * *